US011894760B2

(12) United States Patent
Chen et al.

(10) Patent No.: US 11,894,760 B2
(45) Date of Patent: Feb. 6, 2024

(54) CONTROL CIRCUIT AND METHOD FOR FUEL-SAVING MULTI-STATE SWITCH

(71) Applicant: Xiamen Yaxon Network Co., Ltd, Fujian (CN)

(72) Inventors: Wenshun Chen, Fujian (CN); Jiaxiang Li, Fujian (CN)

(73) Assignee: Xiamen Yaxon Network Co., Ltd, Fujian (CN)

( * ) Notice: Subject to any disclaimer, the term of this patent is extended or adjusted under 35 U.S.C. 154(b) by 244 days.

(21) Appl. No.: 17/576,935

(22) Filed: Jan. 15, 2022

(65) Prior Publication Data
US 2022/0140720 A1 May 5, 2022

Related U.S. Application Data

(63) Continuation of application No. PCT/CN2020/102151, filed on Jul. 15, 2020.

(30) Foreign Application Priority Data

Jul. 19, 2019 (CN) .......................... 201910654794.6

(51) Int. Cl.
*H02M 3/07* (2006.01)
*H02M 1/00* (2006.01)

(52) U.S. Cl.
CPC ......... *H02M 1/007* (2021.05); *H02J 2207/20* (2020.01)

(58) Field of Classification Search
CPC ... H02M 3/07; H02J 2207/20; F02D 2250/18; F02D 2250/26
See application file for complete search history.

(56) References Cited

U.S. PATENT DOCUMENTS

| 7,104,347 | B2* | 9/2006 | Severinsky | ............ F02B 37/16 180/65.23 |
| 2011/0213540 | A1* | 9/2011 | Tripathi | .................. F02D 17/02 701/102 |
| 2013/0234610 | A1 | 9/2013 | Terlizzi et al. | |

FOREIGN PATENT DOCUMENTS

| CN | 201301754 Y | 9/2009 |
| CN | 101825026 A | 9/2010 |

(Continued)

OTHER PUBLICATIONS

International Search Report and English Translation cited in PCT/CN2020/102151 dated Oct. 19, 2020, 7 pages.

(Continued)

*Primary Examiner* — Jue Zhang
*Assistant Examiner* — Afework S Demisse
(74) *Attorney, Agent, or Firm* — Cooper Legal Group LLC

(57) ABSTRACT

A control circuit and method for a fuel-saving multi-state switch is provided. The control circuit comprises a vehicle body ECU, a fuel-saving control unit, and a PWM voltage regulating unit. The fuel-saving control unit is connected to the vehicle body ECU through a CAN bus to collect CAN signals. The fuel-saving control unit determines a switch gear required by a current vehicle according to the CAN signals and outputs a PWM pulse signal having a corresponding duty cycle. The PWM voltage regulating unit is connected to the fuel-saving control unit to receive the PWM pulse signal. The PWM voltage regulating unit outputs a voltage value corresponding to the switch gear according to the PWM pulse signal. The vehicle body ECU is connected to the PWM voltage regulating unit to receive the voltage value, so as to control a speed and torque of an engine according to the voltage value.

13 Claims, 3 Drawing Sheets

(56) References Cited

FOREIGN PATENT DOCUMENTS

| CN | 102647172 A | 8/2012 |
|---|---|---|
| CN | 103832288 A | 6/2014 |
| CN | 104358620 A | 2/2015 |
| CN | 205532901 U | 8/2016 |
| CN | 111305957 A | 6/2020 |

OTHER PUBLICATIONS

Written Opinion cited in PCT/CN2020/102151 dated Oct. 19, 2020, 4 pages.

\* cited by examiner

CONTROL CIRCUIT AND METHOD FOR FUEL-SAVING MULTI-STATE SWITCH

RELATED APPLICATIONS

This application is a continuation of and claims priority to International patent application number PCT/CN2020/102151, filed on Jul. 15, 2020, which claims priority to Chinese patent application number 201910654794.6, filed on Jul. 19, 2019. International patent application number PCT/CN2020/102151 and Chinese patent application number 201910654794.6 are incorporated herein by reference.

FIELD OF THE DISCLOSURE

The present disclosure relates to the technical field of vehicle fuel savings, and in particular to a control circuit of a fuel-saving multi-state switch.

BACKGROUND OF THE DISCLOSURE

At present, the electronic control systems of commercial vehicles have basically added a multi-state switch function, which can limit a speed of an engine according to operating conditions of the vehicle and make the engine run in a specified torque and speed range. When the vehicle is in a state of half load or no load, driving habits of a driver can be effectively improved and fuel consumption of the vehicle can be reduced by limiting output torque and speed of the engine. Under existing conditions, a fuel-saving multi-state switch gear requires the driver to operate the fuel-saving multi-state switch gear in real time, which is inconvenient to use, and an actual load situation does not match a position of the fuel-saving multi-state switch gear, resulting in poor fuel-saving effects.

BRIEF SUMMARY OF THE DISCLOSURE

The present disclosure provides a control circuit and method for a fuel-saving multi-state switch that does not require manual intervention, has high reliability, and has a better fuel-saving effect.

The present disclosure provides a first technical solution as follows.

A control circuit for a fuel-saving multi-state switch comprises a vehicle body Electronic Control Unit (ECU), a fuel-saving control unit, and a Pulse Width Modulation (PWM) voltage regulating unit. The fuel-saving control unit is connected to the vehicle body ECU through a Controller Area Network (CAN) bus to be configured to collect CAN signals, and the fuel-saving control unit is configured to determine a switch gear required by a current vehicle according to the CAN signals and output a PWM pulse signal having a corresponding duty cycle. The PWM voltage regulating unit is connected to the fuel-saving control unit to be configured to receive the PWM pulse signal, and the PWM voltage regulating unit is configured to output a voltage value corresponding to the switch gear according to the PWM pulse signal. The vehicle body ECU is connected to the PWM voltage regulating unit to be configured to receive the voltage value, so as to control a speed and torque of an engine according to the voltage value.

In a preferred embodiment, the PWM voltage regulating unit comprises a fuel-saving control circuit, a charging and discharging circuit, and an emitter follower circuit. The fuel-saving control circuit comprises a switching tube. An input terminal of the switching tube is connected to the PWM pulse signal, and an output terminal of the switching tube is connected to the charging and discharging circuit. An input terminal of the charging and discharging circuit is connected to the output terminal of the switching tube, and an output terminal of the charging and discharging circuit is connected to the emitter follower circuit. The emitter follower circuit comprises an operational amplifier. An input terminal of the operational amplifier is connected to the charging and discharging circuit, and an output terminal of the operational amplifier is configured to output the voltage value. When the PWM pulse signal is at a high level, the switching tube is turned on and the charging and discharging circuit performs discharging. When the PWM pulse signal is at a low level, the switching tube is turned off and the charging and discharging circuit performs charging.

In a preferred embodiment, the switching tube is a transistor.

In a preferred embodiment, the fuel-saving control circuit comprises a first resistor and a second resistor. A first end of the first resistor is connected to the PWM pulse signal having the corresponding duty cycle, and a second end of the first resistor is connected to each of a first end of the second resistor and a base of the transistor. A second end of the second resistor and an emitter of the transistor are both grounded, and a collector of the transistor is connected to the charging and discharging circuit.

In a preferred embodiment, the charging and discharging circuit comprises a third resistor, a fourth resistor, a first diode, a second diode, a first capacitor, and a second capacitor. A first end of the third resistor is connected to a Direct Current (DC) power supply, and a second end of the third resistor is connected to each of an anode of the first diode and a cathode of the second diode. An anode of the second diode is connected to a first end of the fourth resistor, and a second end of the fourth resistor is connected to each of a cathode of the first diode, a first end of the first capacitor, and a first end of the second capacitor. A second end of the first capacitor and a second end of the second capacitor are both grounded.

In a preferred embodiment, the operational amplifier is a non-inverting amplifier, and a non-inverting input terminal of the non-inverting amplifier is connected to the charging and discharging circuit. A positive power terminal of the non-inverting amplifier is connected to the DC power supply, and an inverting input terminal of the non-inverting amplifier is connected to an output terminal. The output terminal is configured to output the voltage value.

In a preferred embodiment, the emitter follower circuit further comprises a fifth resistor and a third capacitor. The fifth resistor is connected to the non-inverting input terminal of the non-inverting amplifier, and a negative power terminal of the non-inverting amplifier is grounded. An output terminal of the non-inverting amplifier is grounded through the third capacitor.

In a preferred embodiment, the fuel-saving control unit is a MCU. The MCU is connected to a vehicle body CAN via the CAN bus to be configured to collect messages of the vehicle body CAN in real time, and the MCU is configured to analyze and calculate the messages to determine the switch gear required by the current vehicle.

In a preferred embodiment, the switch gear comprises a heavy-load gear, a mid-load gear, and a no-load gear, and the voltage value comprises a first voltage value, a second voltage value, and a third voltage value which respectively correspond to the heavy-load gear, the mid-load gear, and the no-load gear.

The present disclosure provides a second technical solution as follows.

A control method for a fuel-saving multi-state switch, comprising: (1) collecting CAN signals by a fuel-saving control unit which is connected to a vehicle body ECU through a CAN bus, determining, by the fuel-saving control unit, a switch gear required by a current vehicle according to the CAN signals, and outputting, by the fuel-saving control unit, a PWM pulse signal having a corresponding duty cycle; (2) receiving the PWM pulse signal by a PWM voltage regulating unit which is connected to the fuel-saving control unit, and outputting, by the PWM voltage regulating unit, a voltage value corresponding to the switch gear according to the PWM pulse signal; and (3) receiving the voltage value by the vehicle body ECU which is connected to the PWM voltage regulating unit, and controlling, by the vehicle body ECU, a speed and torque of an engine according to the voltage value.

In a preferred embodiment, the PWM voltage regulating unit comprises a fuel-saving control circuit, a charging and discharging circuit, and an emitter follower circuit. The fuel-saving control circuit comprises a switching tube. An input terminal of the switching tube is connected to the PWM pulse signal, and an output terminal of the switching tube is connected to the charging and discharging circuit. An input terminal of the charging and discharging circuit is connected to the output terminal of the switching tube, and an output terminal of the charging and discharging circuit is connected to the emitter follower circuit. The emitter follower circuit comprises an operational amplifier. An input terminal of the operational amplifier is connected to the charging and discharging circuit, and an output terminal of the operational amplifier is configured to output the voltage value. When the PWM pulse signal is at a high level, the switching tube is turned on and the charging and discharging circuit performs discharging. When the PWM pulse signal is at a low level, the switching tube is turned off and the charging and discharging circuit performs charging.

In a preferred embodiment, the fuel-saving control unit is a MCU. The MCU is connected to a vehicle body CAN via the CAN bus to be configured to collect messages of the vehicle body CAN in real time, and the MCU is configured to analyze and calculate the messages to determine the switch gear required by the current vehicle. The switch gear comprises a heavy-load gear, a mid-load gear, and a no-load gear, and the voltage value comprises a first voltage value, a second voltage value, and a third voltage value which respectively correspond to the heavy-load gear, the mid-load gear, and the no-load gear.

Compared with the existing techniques, the technical solution has the following advantages.

The present disclosure collects CAN bus data, analyzes and calculates the current demand gear through the fuel-saving control unit, and provides PWM pulse signals to the PWM voltage regulating unit to output the voltage value. The PWM voltage regulating unit transmits the voltage value to the vehicle body ECU through a hard wire for real-time control of the fuel-saving multi-state switch. The present disclosure can automatically control the fuel-saving multi-state switch. Compared with the traditional, manual switch, the fuel-saving multi-state switch has the advantages of simple operation, real-time performance, and higher reliability, and the fuel-saving multi-state switch can ensure the performance of the vehicle. Under this premise, the fuel-saving multi-state switch can achieve a win-win situation of power and economy, and the fuel-saving multi-state switch can improve driving safety without manual intervention in gear operation.

The above description is only an overview of the technical solution of the present disclosure. In order to understand the technical means of the present disclosure more clearly, the present disclosure can be implemented in accordance with the content of the specification. To make the above and other objectives, features and advantages of the present disclosure more obvious, specific embodiments of the present disclosure are listed below.

DETAILED DESCRIPTION OF THE EMBODIMENTS

The present disclosure will be further described below in combination with the accompanying drawings and embodiments.

Figure 1:
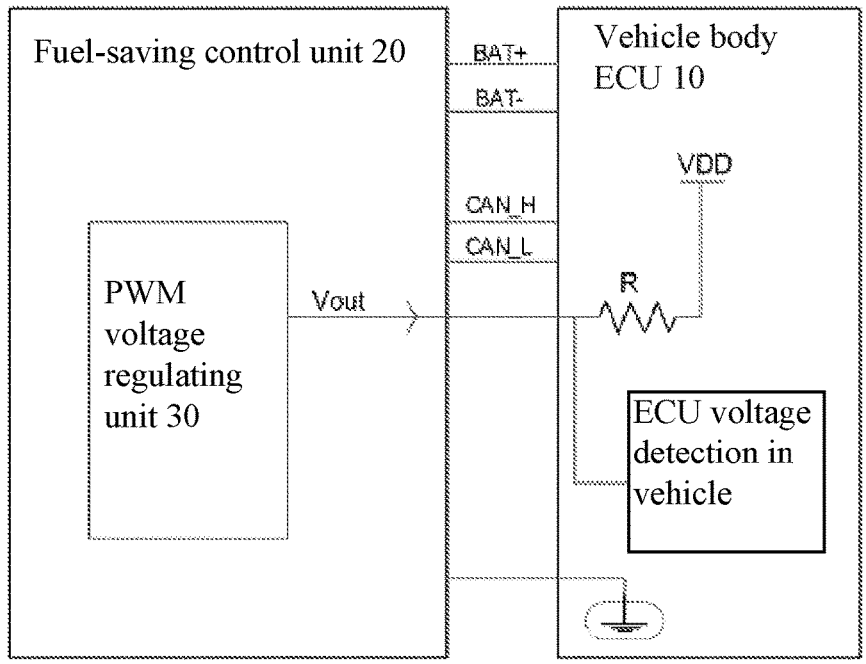
FIG. 1 illustrates a structural block diagram of an embodiment of the present disclosure.
Figure 2:
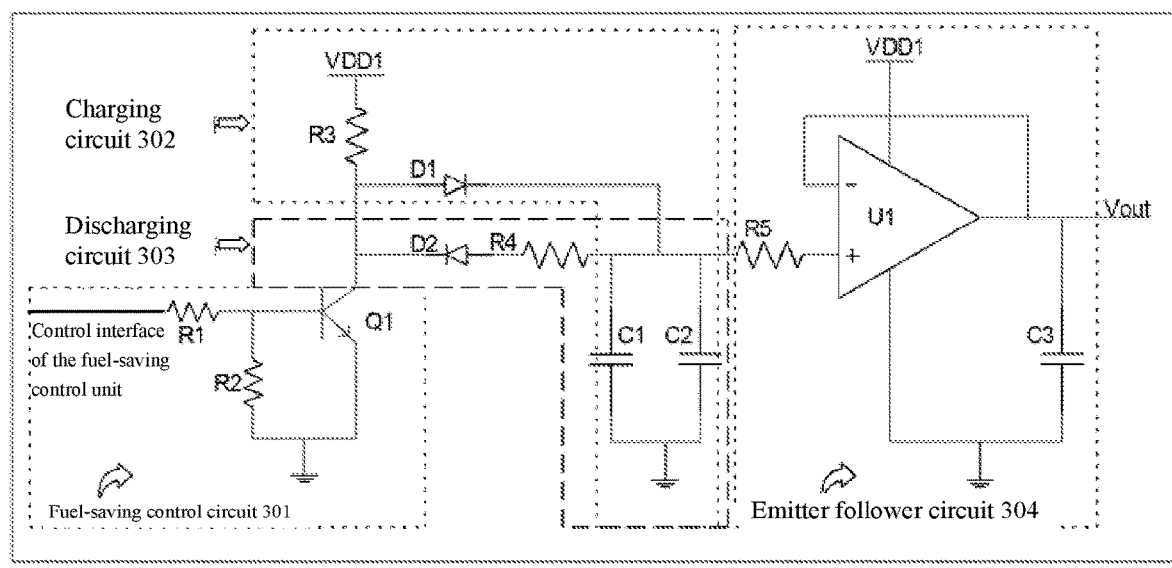
FIG. 2 illustrates a circuit diagram of a Pulse Width Modulation (PWM) voltage regulating unit of an embodiment of the present disclosure.

Referring to FIGS. 1 to 2, a control circuit for a fuel-saving multi-state switch of the present disclosure comprises a vehicle body Electronic Control Unit (ECU) 10, a fuel-saving control unit 20, and a Pulse Width Modulation (PWM) voltage regulating unit 30.

The fuel-saving control unit 20 is connected to the vehicle body ECU 10 through a Controller Area Network (CAN) bus to collect CAN signals, determine a switch gear required by a current vehicle according to the CAN signals, and output a PWM pulse signal having a corresponding duty cycle.

The PWM voltage regulating unit 30 is connected to the fuel-saving control unit 20 to receive the PWM pulse signal and output a voltage value corresponding to the switch gear according to the PWM pulse signal.

The vehicle body ECU 10 is connected to the PWM voltage regulating unit 30 to receive the voltage value and control a speed and torque of an engine according to the voltage value.

The PWM voltage regulating unit 30 comprises a fuel-saving control circuit 301, a charging and discharging circuit, and an emitter follower circuit 304. The fuel-saving control circuit 301 comprises a switching tube. An input terminal of the switching tube is connected to the PWM pulse signal, and an output terminal of the switching tube is connected to the charging and discharging circuit. An input terminal of the charging and discharging circuit is connected to an output terminal of the fuel-saving control circuit 301 (i.e., the output terminal of the switching tube), and an output terminal of the charging and discharging circuit is connected to the emitter follower circuit 304. The emitter follower circuit 304 comprises an operational amplifier. An input terminal of the operational amplifier is connected to the charging and discharging circuit, and an output terminal of the operational amplifier outputs the voltage value. When the PWM pulse signal is at a high level, the switching tube is turned on and the charging and discharging circuit performs discharging. When the PWM pulse signal is at a low level, the switching tube is turned off and the charging and discharging circuit performs charging.

Specifically, the switching tube is a transistor Q1. The fuel-saving control circuit 301 also comprises a first resistor R1 and a second resistor R2. One end of the first resistor R1 is connected to the PWM pulse signal having the corresponding duty cycle, and the other end of the first resistor R1 is connected to each of one end of the second resistor R2 and a base of the transistor Q1. The other end of the second resistor R2 and an emitter of the transistor Q1 are both grounded. A collector of the transistor Q1 is connected to the charging and discharging circuit. When a control interface of the fuel-saving control unit 20 is input with a high level (that is, the high level of the PWM pulse signal, which is 3.3V, for example), the transistor Q1 is turned on, and when the control interface of the fuel-saving control unit 20 is input with a low level (that is, the low level of the PWM pulse signal, which is 0V, for example), the transistor Q1 is turned off.

The charging and discharging circuit comprises a third resistor R3, a fourth resistor R4, a first diode D1, a second diode D2, a first capacitor C1, and a second capacitor C2. One end of the third resistor R3 is connected to a Direct Current (DC) power supply VDD1, and the other end of the third resistor R3 is connected to each of an anode of the first diode D1 and a cathode of the second diode D2. An anode of the second diode D2 is connected to one end of the fourth resistor R4. The other end of the fourth resistor R4 is connected to each of a cathode of the first diode D1, one end of the first capacitor C1, and one end of the second capacitor C2. The other end of the first capacitor C1 and the other end of the second capacitor C2 are both grounded. Specifically, the third resistor R3, the first diode D1, the first capacitor C1, and the second capacitor C2 define a charging circuit 302 of the charging and discharging circuit. When the transistor Q1 is turned off, the DC power supply VDD1 charges the first capacitor C1 and the second capacitor C2 through the third resistor R3 and the first diode D1. The fourth resistor R4, the second diode D2, the first capacitor C1, and the second capacitor C2 define a discharging circuit 303 of the charging and discharging circuit. When the transistor Q1 is turned on, the DC power supply VDD1 stops charging the first capacitor C1 and the second capacitor C2, and the first capacitor C1 and the second capacitor C2 discharge to ground with passing through the fourth resistor R4, the second diode D2, and the transistor Q1.

The operational amplifier is a non-inverting amplifier U1. A non-inverting input terminal of the non-inverting amplifier U1 is connected to the charging and discharging circuit. A positive power terminal of the non-inverting amplifier U1 is connected to the DC power supply VDD1. The inverting input terminal of the non-inverting amplifier U1 is connected to an output terminal Vout, and the output terminal Vout outputs the voltage value.

The emitter follower circuit 304 further comprises a fifth resistor R5 and a third capacitor C3. The fifth resistor R5 is connected to the non-inverting input terminal of the non-inverting amplifier U1. A negative power terminal of the non-inverting amplifier U1 is grounded. An output terminal of the non-inverting amplifier U1 is grounded through the third capacitor C3.

Figure 3:
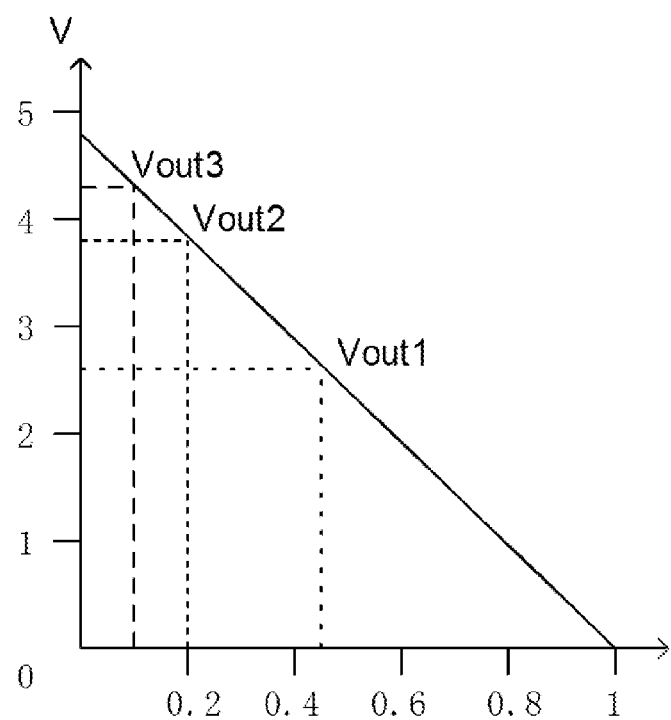
FIG. 3 illustrates a diagram of a relationship between a duty cycle of a PWM pulse signal and a voltage value of an embodiment of the present disclosure.
Figure 4:
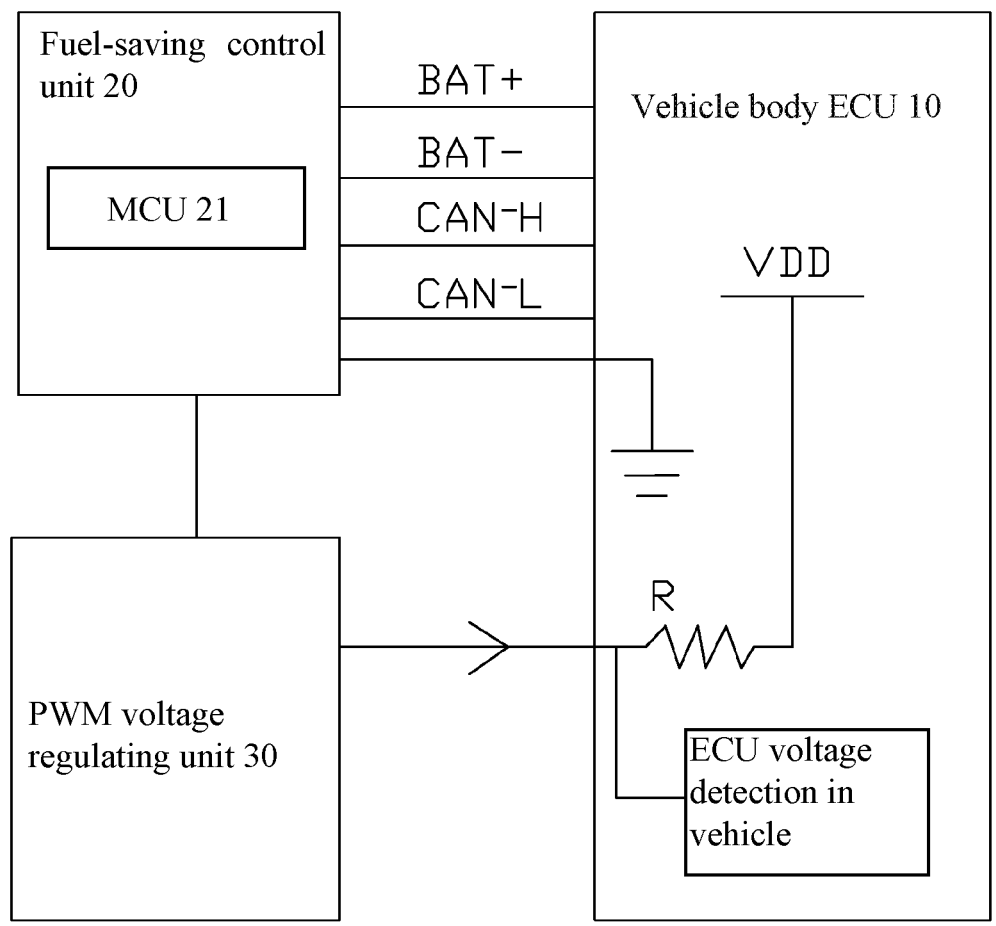
FIG. 4 illustrates another structural block diagram of an embodiment of the present disclosure.

Referring to FIGS. 3 and 4, the fuel-saving control unit 20 in this embodiment is a Microcontroller Unit (MCU) 21, which is connected to a vehicle body CAN via the CAN bus to collect messages of the vehicle body CAN in real time. The fuel-saving control unit 20 analyzes and calculates the messages to determine a multi-state switch gear required by the current vehicle, and the fuel-saving control unit 20 controls the PWM voltage regulating unit 30 to output the voltage value corresponding to the multi-state switch gear, so as to control the multi-state switch gear in real time.

When the vehicle needs to be switched to a heavy-load gear, the fuel-saving control unit 20 outputs a first PWM pulse signal PWM1 having a first duty cycle (e.g., duty cycle is about 45%) to the PWM voltage regulating unit 30, and the PWM voltage regulating unit 30 outputs a first voltage value Vout1, which is transmitted to the vehicle body ECU 10 through a hard wire. The vehicle body ECU 10 sets a vehicle state in the heavy-load gear, and the first voltage value Vout1 of the heavy-load gear is usually 2.6V±0.1V, for example.

When the vehicle needs to be switched to a mid-load gear, the fuel-saving control unit 20 outputs a second PWM pulse signal PWM2 having a second duty cycle (e.g., duty cycle is about 20%) to the PWM voltage regulating unit 30, and the PWM voltage regulating unit 30 outputs a second voltage value Vout2, which is transmitted to the vehicle body ECU 10 through the hard wire. The vehicle body ECU 10 sets the vehicle state in the mid-load gear, and the second voltage value Vout2 of the mid-load gear is usually 3.8V±0.1V, for example.

When the vehicle needs to be switched to a no-load gear, the fuel-saving control unit 20 outputs a third PWM pulse signal PWM3 having a third duty cycle (e.g., duty cycle is about 10%) to the PWM voltage regulating unit 30, and the PWM voltage regulating unit 30 outputs a third voltage value Vout3, which is transmitted to the vehicle body ECU 10 through the hard wire. The vehicle body ECU 10 sets the vehicle state in the no-load gear, and the third voltage value Vout3 is usually 4.4V±0.1V, for example.

A control method for the fuel-saving multi-state switch comprises the follow steps.

The fuel-saving control unit 20 is connected to the vehicle body ECU 10 through the CAN bus to collect the CAN signals, determine a switch gear required by the current vehicle according to the CAN signals, and output the PWM pulse signal having the corresponding duty cycle.

The PWM voltage regulating unit 30 is connected to the fuel-saving control unit 20 to receive the PWM pulse signal and output the voltage value corresponding to a gear according to the PWM pulse signal.

The vehicle body ECU 10 is connected to the PWM voltage regulating unit 30 to receive the voltage value and control the speed and torque of the engine according to the voltage value.

The PWM voltage regulating unit 30 comprises the fuel-saving control circuit 301, the charging and discharging circuit, and the emitter follower circuit 304. The fuel-saving control circuit 301 comprises the switching tube. The input terminal of the switching tube is connected to the PWM pulse signal, and the output terminal of the switching tube is connected to the charging and discharging circuit. The input terminal of the charging and discharging circuit is connected to the output terminal of the fuel-saving control circuit 301 (i.e., the output terminal of the switching tube), and the output terminal of the charging and discharging circuit is connected to the emitter follower circuit 304. The emitter follower circuit 304 comprises the operational amplifier. The input terminal of the operational amplifier is connected to the charging and discharging circuit, and the output terminal of the operational amplifier outputs the voltage value. When the PWM pulse signal is at the high level, the switching tube is turned on, and the charging and discharging circuit performs discharging. When the PWM pulse signal is at the low level, the switching tube is turned off, and the charging and discharging circuit performs charging.

The specific implementation of the control method for the fuel-saving multi-state switch is the same as the control circuit for the fuel-saving multi-state switch, and the description is not repeated in the embodiment of the present disclosure.

The aforementioned embodiments are merely some embodiments of the present disclosure, and the scope of the disclosure is not limited thereto. Thus, it is intended that the present disclosure cover any modifications and variations of the presently presented embodiments provided they are made without departing from the appended claims and the specification of the present disclosure.

What is claimed is:

1. A control circuit for a fuel-saving multi-state switch, comprising:
   a vehicle body Electronic Control Unit (ECU),
   a fuel-saving control unit, and
   a Pulse Width Modulation (PWM) voltage regulating unit, wherein:
      the fuel-saving control unit is connected to the vehicle body ECU through a Controller Area Network (CAN) bus to be configured to collect CAN signals,
      the fuel-saving control unit is configured to determine a switch gear required by a current vehicle according to the CAN signals and output a PWM pulse signal having a corresponding duty cycle,
      the PWM voltage regulating unit is connected to the fuel-saving control unit to be configured to receive the PWM pulse signal,
      the PWM voltage regulating unit is configured to output a voltage value corresponding to the switch gear according to the PWM pulse signal, and
      the vehicle body ECU is connected to the PWM voltage regulating unit to be configured to receive the voltage value, so as to control a speed and torque of an engine according to the voltage value.

2. The control circuit for the fuel-saving multi-state switch according to claim 1, wherein: the PWM voltage regulating unit comprises a fuel-saving control circuit, a charging and discharging circuit, and an emitter follower circuit, the fuel-saving control circuit comprises a switching tube, an input terminal of the switching tube is connected to the PWM pulse signal, an output terminal of the switching tube is connected to the charging and discharging circuit, an input terminal of the charging and discharging circuit is connected to the output terminal of the switching tube, an output terminal of the charging and discharging circuit is connected to the emitter follower circuit, the emitter follower circuit comprises an operational amplifier, an input terminal of the operational amplifier is connected to the charging and discharging circuit, an output terminal of the operational amplifier is configured to output the voltage value, when the PWM pulse signal is at a high level: the switching tube is turned on and the charging and discharging circuit performs discharging, and when the PWM pulse signal is at a low level: the switching tube is turned off and the charging and discharging circuit performs charging.

3. The control circuit for the fuel-saving multi-state switch according to claim 2, wherein:
   the switching tube is a transistor.

4. The control circuit for the fuel-saving multi-state switch according to claim 3, wherein:

the fuel-saving control circuit comprises a first resistor and a second resistor,
   a first end of the first resistor is connected to the PWM pulse signal having the corresponding duty cycle,
   a second end of the first resistor is connected to each of a first end of the second resistor and a base of the transistor,
   a second end of the second resistor and an emitter of the transistor are both grounded, and
   a collector of the transistor is connected to the charging and discharging circuit.

5. The control circuit for the fuel-saving multi-state switch according to claim 2, wherein:
   the charging and discharging circuit comprises a third resistor, a fourth resistor, a first diode, a second diode, a first capacitor, and a second capacitor,
   a first end of the third resistor is connected to a Direct Current (DC) power supply,
   a second end of the third resistor is connected to each of an anode of the first diode and a cathode of the second diode,
   an anode of the second diode is connected to a first end of the fourth resistor,
   a second end of the fourth resistor is connected to each of a cathode of the first diode, a first end of the first capacitor, and a first end of the second capacitor, and
   a second end of the first capacitor and a second end of the second capacitor are both grounded.

6. The control circuit for the fuel-saving multi-state switch according to claim 2, wherein:
   the operational amplifier is a non-inverting amplifier,
   a non-inverting input terminal of the non-inverting amplifier is connected to the charging and discharging circuit,
   a positive power terminal of the non-inverting amplifier is connected to a Direct Current (DC) power supply,
   an inverting input terminal of the non-inverting amplifier is connected to an output terminal of the PWM voltage regulating unit, and
   the output terminal of the PWM voltage regulating unit is configured to output the voltage value.

7. The control circuit for the fuel-saving multi-state switch according to claim 6, wherein:
   the emitter follower circuit further comprises a fifth resistor and a third capacitor,
   the fifth resistor is connected to the non-inverting input terminal of the non-inverting amplifier,
   a negative power terminal of the non-inverting amplifier is grounded, and
   an output terminal of the non-inverting amplifier is grounded through the third capacitor.

8. The control circuit for the fuel-saving multi-state switch according to claim 1, wherein:
   the fuel-saving control unit is a Microcontroller Unit (MCU),
   the MCU is connected to a vehicle body CAN via the CAN bus to be configured to collect messages of the vehicle body CAN in real time, and
   the MCU is configured to analyze and calculate the messages to determine the switch gear required by the current vehicle.

9. The control circuit for the fuel-saving multi-state switch according to claim 8, wherein:
   the switch gear comprises a heavy-load gear, a mid-load gear, and a no-load gear, and the voltage value comprises a first voltage value, a second voltage value, and a third voltage value which respectively correspond to the heavy-load gear, the mid-load gear, and the no-load gear.

10. The control circuit for the fuel-saving multi-state switch according to claim 1, wherein:
the switch gear comprises a heavy-load gear, a mid-load gear, and a no-load gear, and
the voltage value comprises a first voltage value, a second voltage value, and a third voltage value which respectively correspond to the heavy-load gear, the mid-load gear, and the no-load gear.

11. A control method for a fuel-saving multi-state switch, comprising:
(1) collecting Controller Area Network (CAN) signals by a fuel-saving control unit which is connected to a vehicle body Electronic Control Unit (ECU) through a CAN bus, determining, by the fuel-saving control unit, a switch gear required by a current vehicle according to the CAN signals, and outputting, by the fuel-saving control unit, a Pulse Width Modulation (PWM) pulse signal having a corresponding duty cycle,
(2) receiving the PWM pulse signal by a PWM voltage regulating unit which is connected to the fuel-saving control unit, and outputting, by the PWM voltage regulating unit, a voltage value corresponding to the switch gear according to the PWM pulse signal, and
(3) receiving the voltage value by the vehicle body ECU which is connected to the PWM voltage regulating unit, and controlling, by the vehicle body ECU, a speed and torque of an engine according to the voltage value.

12. The control method for the fuel-saving multi-state switch according to claim 11, wherein:
the PWM voltage regulating unit comprises a fuel-saving control circuit, a charging and discharging circuit, and an emitter follower circuit,
the fuel-saving control circuit comprises a switching tube,
an input terminal of the switching tube is connected to the PWM pulse signal,
an output terminal of the switching tube is connected to the charging and discharging circuit,
an input terminal of the charging and discharging circuit is connected to the output terminal of the switching tube,
an output terminal of the charging and discharging circuit is connected to the emitter follower circuit,
the emitter follower circuit comprises an operational amplifier,
an input terminal of the operational amplifier is connected to the charging and discharging circuit,
an output terminal of the operational amplifier is configured to output the voltage value,
when the PWM pulse signal is at a high level:
the switching tube is turned on and the charging and discharging circuit performs discharging, and
when the PWM pulse signal is at a low level:
the switching tube is turned off and the charging and discharging circuit performs charging.

13. The control method for the fuel-saving multi-state switch according to claim 11, wherein:
the fuel-saving control unit is a Microcontroller Unit (MCU),
the MCU is connected to a vehicle body CAN via the CAN bus to be configured to collect messages of the vehicle body CAN in real time,
the MCU is configured to analyze and calculate the messages to determine the switch gear required by the current vehicle,
the switch gear comprises a heavy-load gear, a mid-load gear, and a no-load gear, and
the voltage value comprises a first voltage value, a second voltage value, and a third voltage value which respectively correspond to the heavy-load gear, the mid-load gear, and the no-load gear.

* * * * *